United States Patent [19]

Hempling

[11] 3,886,551

[45] May 27, 1975

[54] VIDEO SLOPE RATE DETECTOR

[75] Inventor: Norman G. Hempling, Canoga Park, Calif.

[73] Assignee: The United States of America as represented by the Secretary of the Air Force, Washington, D.C.

[22] Filed: May 26, 1972

[21] Appl. No.: 258,001

Related U.S. Application Data

[63] Continuation of Ser. No. 858,755, Sept. 12, 1969, abandoned.

[52] U.S. Cl. .............................................. 343/18 E
[51] Int. Cl. .............................................. G01s 7/36
[58] Field of Search ................................. 343/18 E

[56] References Cited
UNITED STATES PATENTS

| | | | |
|---|---|---|---|
| 3,670,333 | 6/1972 | Winn | 343/18 E |
| 3,716,853 | 2/1973 | La Follette | 343/18 E X |
| 3,764,999 | 10/1973 | Simons et al. | 343/18 E X |

Primary Examiner—T. H. Tubbesing
Attorney, Agent, or Firm—William Stephanishen

[57] ABSTRACT

An apparatus for measuring the rate of change of voltage and the polarity of a pulse having a two input terminal differential amplifier with a delay line connected to one of the input terminals.

2 Claims, 1 Drawing Figure

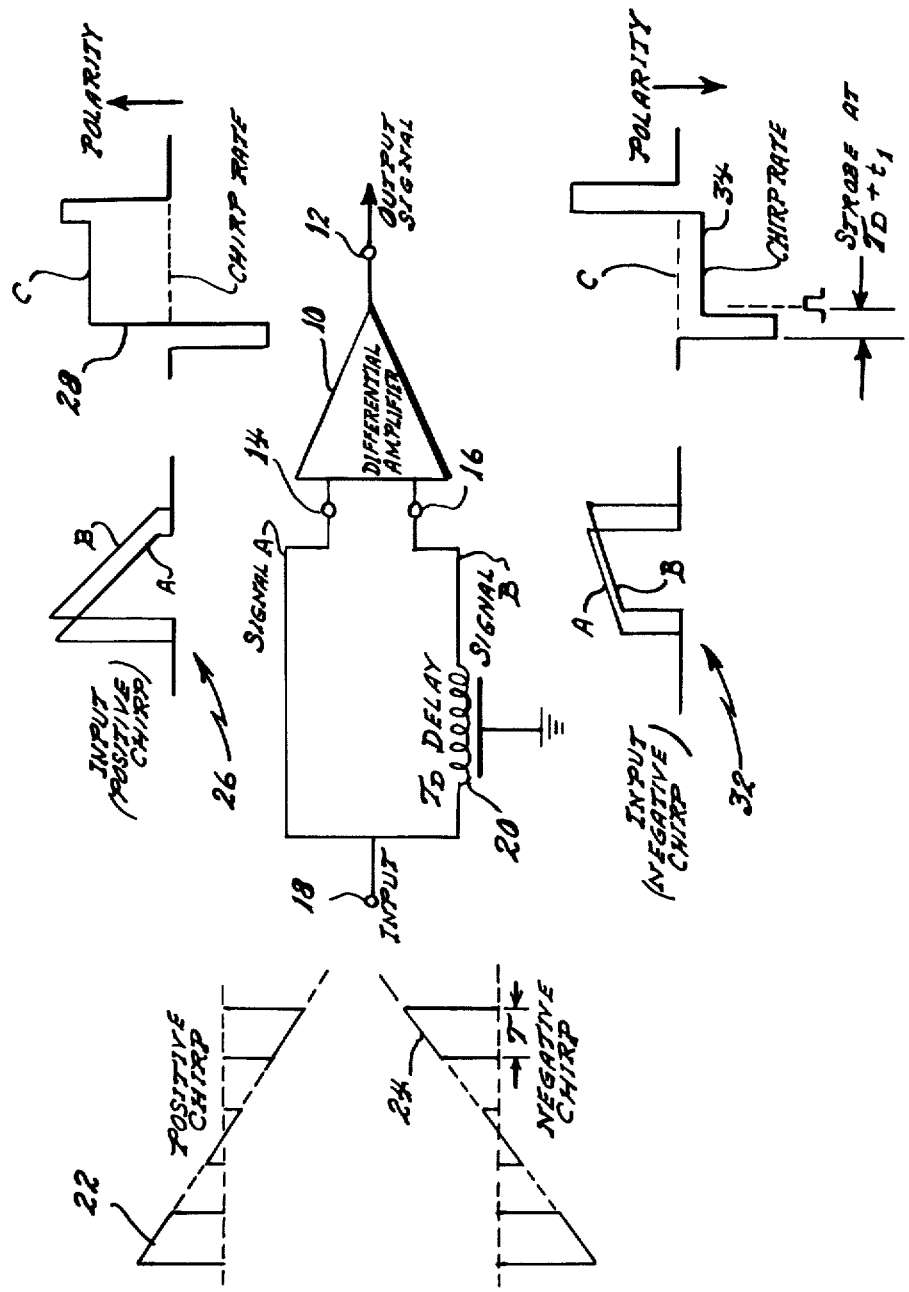

VIDEO SLOPE RATE DETECTOR

This is a continuation, of application Ser. No. 858,255, filed Sept. 12, 1969, now abandoned.

BACKGROUND OF THE INVENTION

This invention is concerned with an apparatus for measuring the rate of change of voltage on top of a pulse independent of the polarity of the pulse, and particularly with an improved means for providing video slope rate detection information for utilization within detection denial countermeasures apparatus. Among the many uses of detection denial countermeasures apparatus one of the primary uses would be the utilization of this countermeasure technique to protect our satellites against enemy radar surveillance systems. The requirements for high speed detection and the simultaneous elimination of false alarms are universal and, therefore, the applicability of detection denial countermeasures can be predicted from the transmitted characteristics of the enemy radar.

The application of detection denial countermeasures in an orbiting system might require signal recognition of the enemy system's signal characteristics in order to optimumly match the detection denial countermeasures signal to the radar's transmission. The utilization of known signal recognition techniques are applicable in a detection denial system. Signal recognition with respect to detection denial is unique since signal recognition must occur within the first few microseconds of the pulse duration and must perform on a pulse-to-pulse basis because of the possibility that the enemy radar may be transmitting a variety of different modulations. The factor of intrapulse signal recognition is an extremely important requirement if the detection denial countermeasures apparatus is to function effectively.

SUMMARY OF THE INVENTION

The video slope rate detector apparatus utilizes a differential amplifier having two input terminals with a delay line connected to one of the input terminals. An FM discriminator signal which is applied to the video slope rate detector apparatus input terminals, is normalized in amplitude with respect to the slope characteristics of the discriminator curve. The amplitude of output signal waveform at its center portion is directly proportional to the slope on top of the input pulse. The polarity of the center portion of the output signal waveform is a measure of the input pulse chirp direction. If the input pulse is a continuous wave signal (i.e., it contains no slope), the center portion of the signal would be zero.

It is an object of the invention, therefore, to provide an improved video slope rate detector apparatus having an output signal whose amplitude is directly proportional to the slope of an input signal.

It is another object of the invention to provide an improved video slope rate detector apparatus having an output signal whose polarity provides the chirp direction of the applied input pulse.

It is still another object of the invention to provide a video slope rate detector apparatus having signal recognition capabilities which are operative within the first few microseconds of the applied input pulse.

It is a further object of the invention to provide a video slope rate detector operating on a pulse-to-pulse basis to furnish slope and amplitude information relating to the applied input signal.

DESCRIPTION OF THE DRAWING

These and other advantages, features and objects of the invention will become more apparent from the following description taken in connection with the illustrative embodiment in the accompanying drawing, wherein the FIGURE is a block diagram of the video slope rate detector apparatus.

DESCRIPTION OF THE PREFERRED EMBODIMENT

The video slope rate detector represented in the FIGURE comprises a differential amplifier 10 having a single output terminal 12, two differential amplifier input terminals 14, 16, a single video slope rate detector input terminal 18, and a delay line 20. The video slope rate detector input terminal 18 is directly connected to differential amplifier input terminal 14 and is connected through delay line 20 to differential amplifier input terminal 16. A frequency modulated (hereinafter referred to as FM) discriminator signal 22, 24 (22 being the positive signal, 24 the negative slope signal) which is received at input terminal 18 is applied to differential amplifier 10 via the provided signal paths. The undelayed positive FM discriminator signal is represented by signal A and the undelayed positive slope signal is shown by input waveform signal representation 26 as waveform A. The delayed positive FM discriminator signal is represented by signal B and the delayed positive slope signal is shown by input waveform signal representation 26 as waveform B. Differential amplifier 10 processes signals A and B and produces at output terminal 12 an output signal C which is representative of the amplitude and slope of the applied FM discriminator signal. The positive output signal C is shown by waveform 28.

A negative slope FM discriminator signal 24 which is applied to input terminal 18 is shown by waveform representation 32 in its undelayed signal form (signal A) and in its delayed signal form (signal B). These are the waveform signals which appear at terminals 14, 16 if suitable test equipment, such as an oscilloscope were attached to these terminals. The differential amplifier 10 processes the signals and produces at output terminal 12 an output signal C (shown by waveform 34) which is representative of the amplitude and slope of the applied FM discriminator signal.

The video slope rate detector as described herein provides a unique technique for measuring the FM rate of a linear FM pulse. The technique is also useful for measuring the rate of change in slope of a ramp waveform. An FM receiver may be used to detect an FM pulse and the resulting video output would be a pulse with a normalized ramp top whose slope is proportional to the volts/Hertz sensitivity of the receiver. The chirp information, however, is contained only on the top of the pulse and has no relationship to the absolute amplitude of the pulse. If one observes the output of the FM receiver, the pulse would be positive, positive and negative, or negative, depending upon the portion of the FM discriminator curve the pulse happened to fall within. The problem, therefore, is to extract the ramp information on the top of the pulse independently of the absolute pulse polarity. The video slope rate detector which previously has been described not only provides a voltage which is the analog of the slope of the pulse, but also provides an indication of the slope direction (increasing or decreasing) by providing a voltage change which is proportionally positive or negative.

The output amplitude of the differential amplifier is given by $$e_o = k\alpha[t - (t - T_D)] \quad T_D < t < T - T_D$$

where
$k$ = amplifier gain
$\alpha$ = slope of ramp
$T_D$ = delay line delay
$T$ = pulse width.

The technique which is shown by the video slope rate detector to detect the chirp rate of an FM pulse is useful any time the slope of a wave form must be measured. By making appropriate modifications a measure of the rate of change of the ramp slope may also be obtained.

I claim:

1. A method of measuring the slope and polarity of an applied signal, which comprises:
   applying a pulsed input signal to a differential amplifier first input terminal,
   delaying said pulsed input signal by a predetermined time and applying it to the second input terminal of said differential amplifier,
   processing said pulsed input signal and said delayed pulsed input signal within said differential amplifier to provide an output signal which is an indication of the slope direction and polarity of said pulsed input signal.

2. The method of measuring the slope and polarity of an applied signal as described in claim 1, wherein said processing step includes the steps
   comparing said pulsed input signal and said delayed pulsed input signal to determine the slope direction of said pulsed input signal,
   detecting the slope direction of said pulsed input signal,
   determining the polarity of said slope direction,
   generating an analog voltage output signal, and
   biasing said analog voltage output signal to indicate the polarity of said slope direction of said pulsed input signal.

* * * * *